United States Patent

[11] 3,576,966

| [72] | Inventor | Cornelius J. Sullivan |
| | | Berkeley Heights, N.J. |
| [21] | Appl. No. | 626,026 |
| [22] | Filed | Mar. 27, 1967 |
| [45] | Patented | May 4, 1971 |
| [73] | Assignee | Air Reduction Company, Incorporated |
| | | New York, N.Y. |

[54] ARC-WELDING IN NARROW GAP
2 Claims, 8 Drawing Figs.

[52] U.S. Cl.............................................. 219/137,
219/125
[51] Int. Cl........................................ B23k 9/12
[50] Field of Search................................. 219/74,
126, 130, 137, 124, 125, 145

[56] References Cited
UNITED STATES PATENTS
| 1,907,051 | 5/1933 | Emery.......................... | 219/145 |
| 2,407,746 | 9/1946 | Johnson....................... | 219/145 |
| 3,053,975 | 9/1962 | Nelson et al................. | 219/130 |
| 3,118,047 | 1/1964 | Johnson....................... | 219/73 |
| 3,123,702 | 3/1964 | Keidel et al................. | 219/74 |
| 3,328,556 | 6/1967 | Nelson et al................. | 219/137 |

*Primary Examiner*—A. Bartis
*Assistant Examiner*—J. G. Smith
*Attorneys*—Larry R. Cassett, Edmund W. Bopp and H. Hume Mathews ABSTRACT: A welding wire of serpentine form is fed into an electric arc in a narrow gap between workpieces to be joined, the wire passing through a contact tube which is sheathed in electrical insulation to avoid short-circuiting to the workpieces, the serpentine form of the wire serving to direct the arc toward one side of the gap or the other in periodic oscillations as the electrode is moved lengthwise of the gap from one end to the other, and the seam is built up layer by layer in repeated passes of the electrode. Means are shown for bending the wire to the desired form.

INVENTOR
CORNELIUS J. SULLIVAN
BY
ATTORNEY

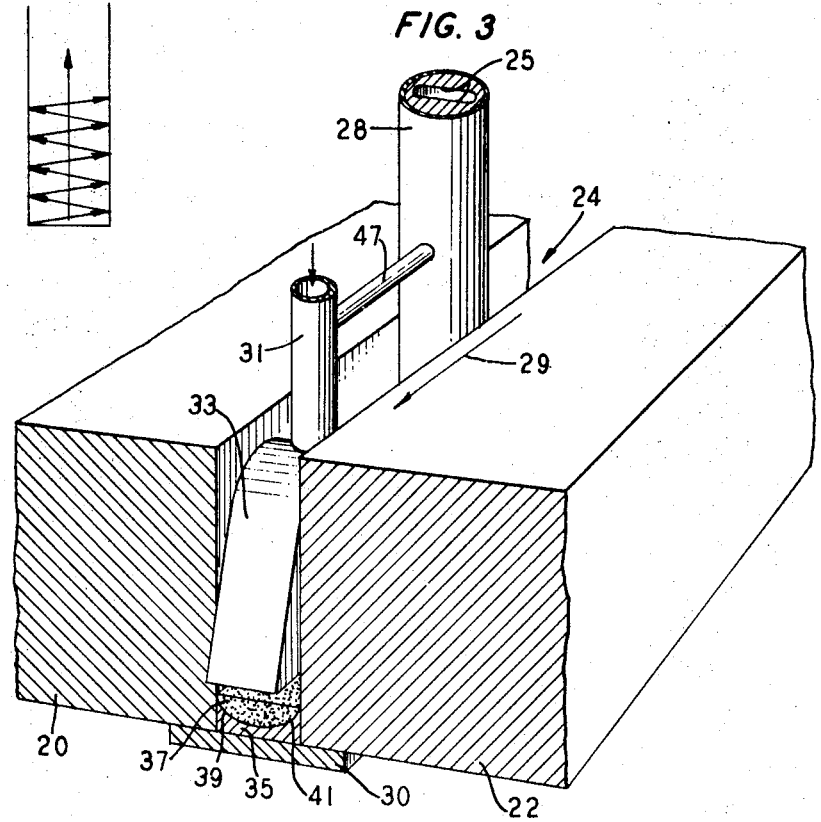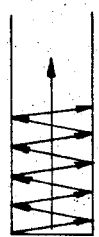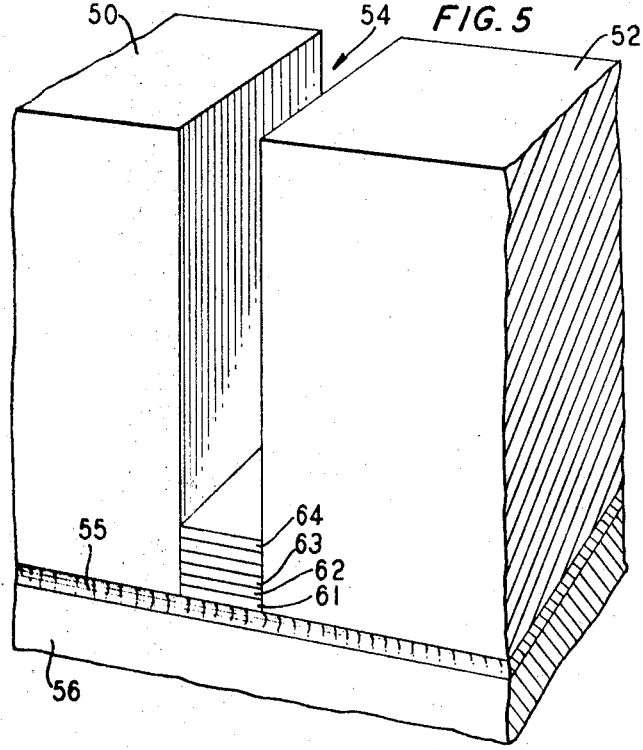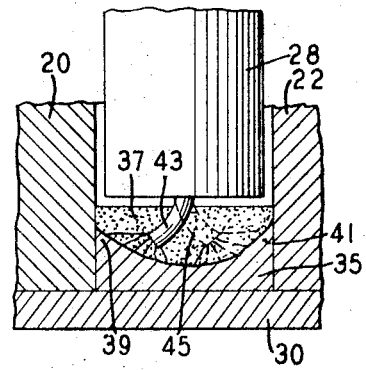
INVENTOR
CORNELIUS J. SULLIVAN
BY
ATTORNEY

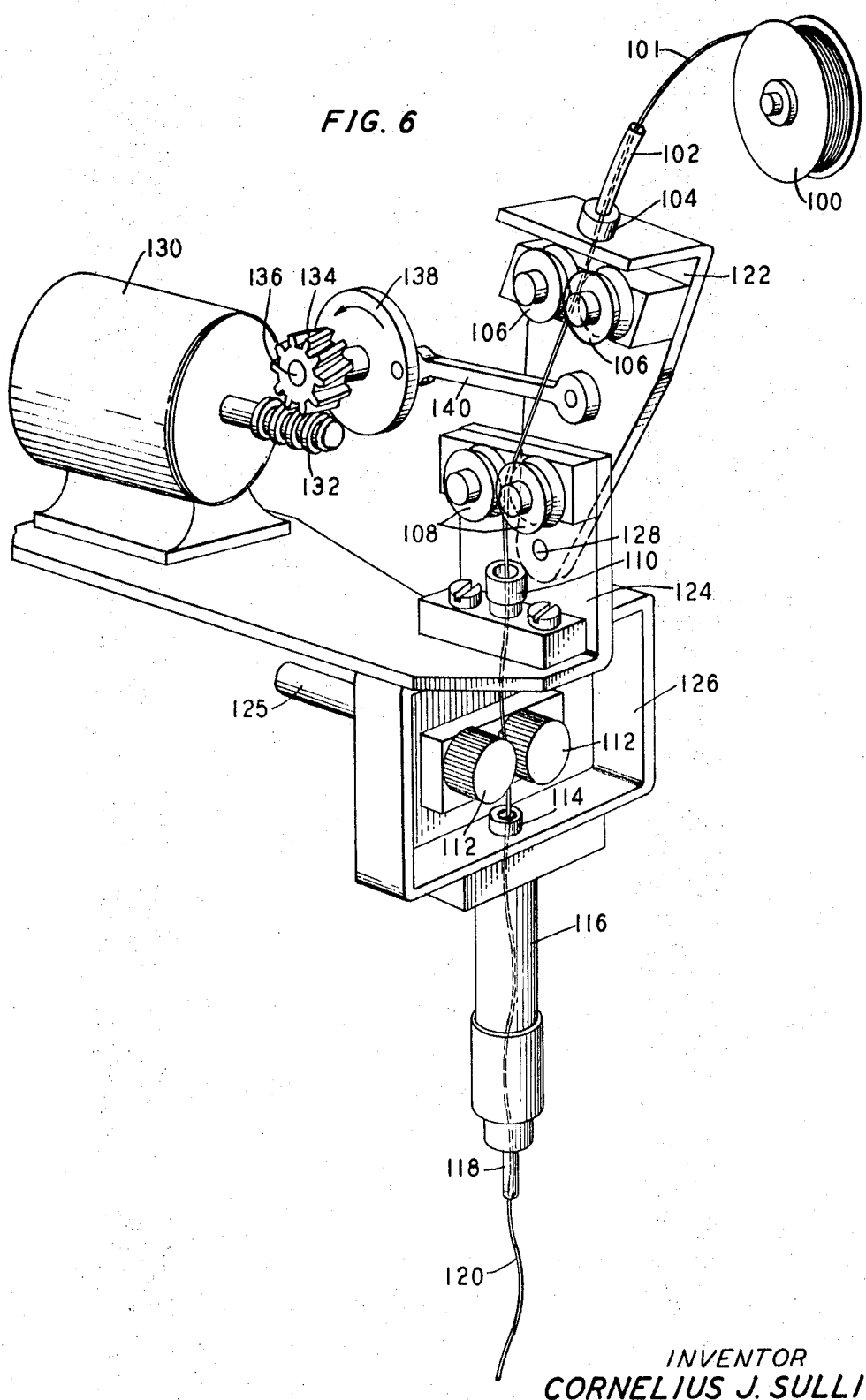

FIG. 7

INVENTOR
CORNELIUS J. SULLIVAN
BY *Larry R. Cassett*
ATTORNEY

ARC-WELDING IN NARROW GAP

In the past, in filling up a gap or deep, narrow groove, as between two plates, it has been found necessary to lay down successive beads alternately on the two sides of the gap or groove. In this way it was assured that there would be proper fusion of each bead with the plate on one side. It required at least two beads to form a single layer of weld metal extending across from plate to plate.

It is an object of the present invention to lay down a single bead which extends from plate to plate and which fuses properly with the plates on both sides of the gap or groove as well as with the underlying layer of solidified weld metal.

A related object is to so shape the bead as to form rounded fillets where the bead meets the plates, thereby presenting a curved bead surface upon which slag may solidify in a submerged arc-welding process with the result that the solidified slag is easily dislodged from the bead for removal before a second bead is laid upon the first.

The invention has certain advantages over conventional methods such as submerged arc-welding or the welding or the use of a coated electrode. These advantages include a reduction in the total amount of weld metal which must be deposited to finish a joint. Welding by the method of the invention tends to be gravity resistant, and to further enhance this property the method may be combined with the dip transfer mode disclosed in U.S. Pat. No. 2,886,696, issued May 12, 1959 to R. W. Tuthill and A. U. Welch and owned by the assignee hereof. In a gravity-resistant process there is present in the weld pool at any given time no more molten metal than will stay in place even against the force of gravity. Such a process is therefore particularly advantageous for welding in positions where by normal procedures the weld metal would run out of the seam before it could solidify, or where welding dams are usually required to contain the weld metal. The invention is also applicable, however, to all positions of welding, including downhand welding as in a horizontal seam in flat work, where running of the weld metal under gravity is not a factor. Furthermore, the invention may be used in conjunction with welding dams where the weld metal would otherwise run out.

The invention is not limited to use with the dip transfer method of welding but is generally applicable to filler metal electric arc-welding by any known process. Specifically included in such methods is pulsed arc-welding as disclosed in U.S. Pat. No. 3,071,680, issued Jan. 1, 1963 to N. E. Anderson and W. J. Greene, owned by the assignee hereof.

The narrow groove method of welding is economical of weld metal as compared with welding in a wide groove or in a V-groove. Furthermore, the heat input in narrow groove welding is considerably less than in wide groove welding. As a result, the zone of metal surrounding the actual weld which is metallurgically altered by the heat spreading out from the weld is of much smaller volume than is the case with wide groove welding. Since the heating effect may alter the desirable properties of the base metal, for example reduce the yield strength or the toughness, it is necessary to reduce the spread of the heat as much as possible.

Accordingly, it is an object of the invention to improve the process of narrow groove welding while retaining substantially all the advantages of the prior practices.

A further object of the invention is to reduce the cost of butt-welding, while improving the strength of the resulting weld.

Another object is to simplify, and to increase the speed of, butt-welding.

Another object is to reduce the number of beads required to build up a given thickness of weld.

Another object is to reduce the amount of cutting or machining needed in preparing the member work parts for welding.

A further object is to control independently the amplitude and the length of bends in a serpentine or crinkled electrode wire that is prepared for use in laying down a weld bead the width of the gap between the work parts.

A feature of the invention is that the weld bead is extended from plate to plate in a single pass.

Another feature is a reciprocating or oscillating member in conjunction with the usual feed rolls for bending the electrode wire as it is fed to the electric arc.

Another feature is that the contact tube and a shielding gas nozzle are independently movable in the vertical direction.

Another feature is a single gas delivery system which provides proper shielding of the arc even in a deep, narrow groove, during the entire process of laying down weld beads from bottom to top of the groove.

A further feature is that the gas nozzle remains outside of the groove or gap during the entire butt-welding operation.

In accordance with the invention the gap is filled up in a series of passes, each pass laying down a weld bead which fills the width of the gap from plate to plate, using an arc which oscillates across the gap from side to side while moving horizontally through the gap, the plates being either in horizontal position or in vertical position and unrestricted as to thickness. The apparatus comprises an externally electrically insulated contact tube which extends into the gap and a crinkled, serpentine or wave-formed consumable electrode wire for causing the arc to oscillate. When an arc is established and maintained between the serpentine wire and the work, the arc moves from side to side, following the pointing direction of the end of the wire as the material of the wire is melted and transferred to the work.

Other features, objects and advantages will appear from the following more detailed description of an illustrative embodiment of the invention, which will now be given in conjunction with the accompanying drawings.

In the drawings,

FIG. 3 is a perspective view, partly in section, of another embodiment of the invention;

FIG. 4 is a plan diagram illustrating the manner in which a bead is deposited in a narrow groove;

FIG. 5 is a perspective view of a partially completed seam between thick plates vertically disposed;

FIG. 6 is a perspective view of one form of apparatus for deforming a wire electrode into serpentine form as the wire is passed from a reel to the nozzle of a welding torch;

FIG. 7 is a perspective view of another form of apparatus for deforming the wire electrode; and FIG. 8 is an enlarged view of a portion of the apparatus shown in FIG. 3, useful in explaining the operation of the apparatus shown in that FIG.

Figure 1:
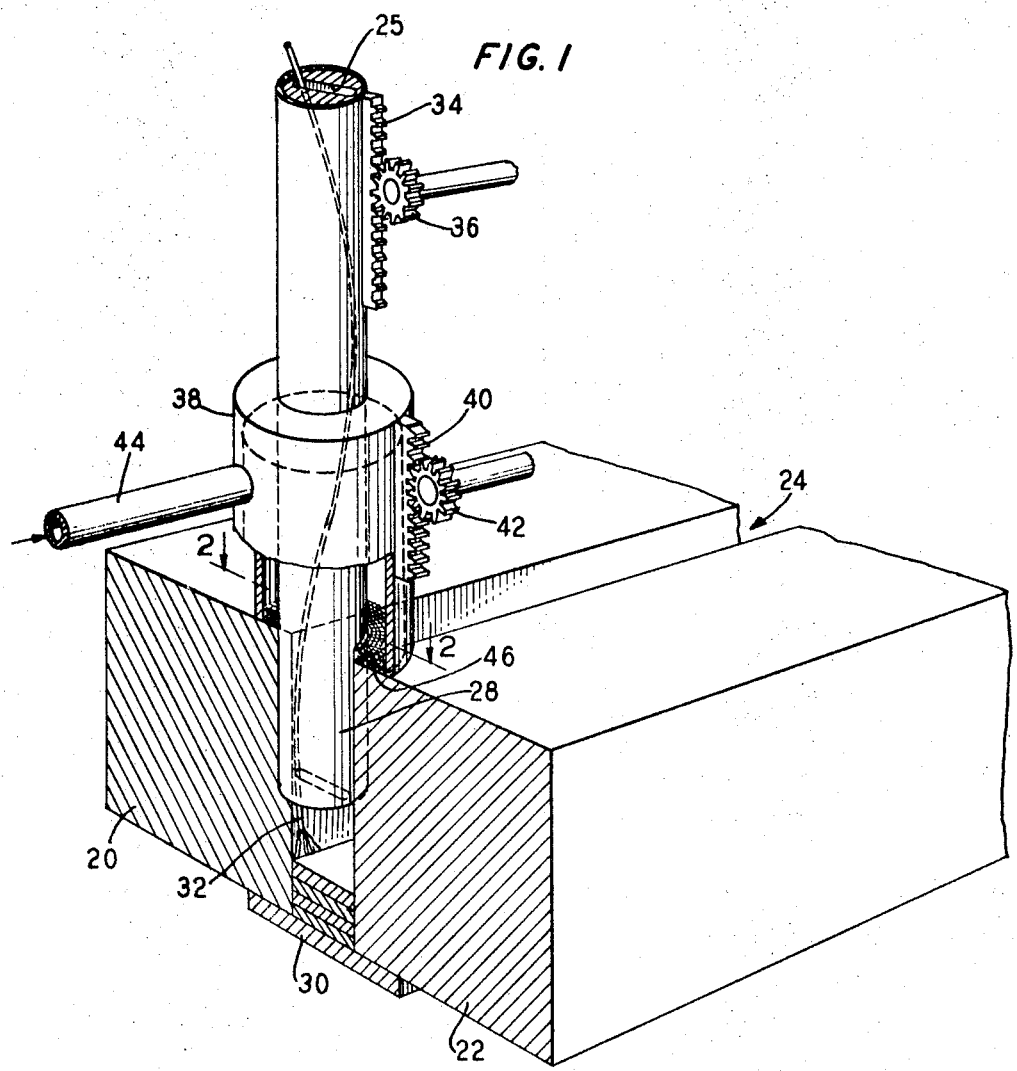
FIG. 1 is a perspective view, partly in section, of one embodiment of the invention, shown with respect to a seam to be welded between horizontally disposed plates.

FIGS. 1—4 shown applicant's improved apparatus and method as applied to making a butt joint between horizontally disposed plates 20 and 22, separated initially by a gap 24. The gap need be only wide enough to accommodate an externally electrically insulated contact tube 28 with side clearance to allow passage of the contact tube within the gap, and the gap may be closed at the bottom if necessary by a backup strip 30. The consumable wire electrode 32 emerges from the bottom of the contact tube 28 in a serpentine wave form, the curve of which lies approximately in the plane of the paper as shown in FIG. 1. The contact tube 28 extends down into the gap 24 to the extent required to lay down successive beads beginning at the bottom of the gap 24 and is lowered and raised as needed by gearing illustrated as a rack 34, upon the contact tube 28, and a cooperating spur gear 36, so that the contact tube can be lowered to the proper level to lay down the first bead and then raised the proper amount as each succeeding bead is added on top of the preceding one.

As the tip of the wire 32 oscillates due to the melting back of the wire as the deposition metal is deposited to form the bead, the welding head which carries the contact tube 28 is moved along parallel to the length of the gap to complete the seam from end to end of the gap. FIG. 4 shows diagrammatically the approximate path of the arc as well as of the tip of the wire, looking down upon a bead that is being laid.

In the embodiments shown, in which welding dams are not used, the bead is laid down preferably at a rate such that the weld metal will solidify without running out of the gap and so as to form a layer extending from plate to plate. There is no restriction on the length of the gap. When a bead has been completed, the contact tube 28 is raised a sufficient amount to allow for the thickness of the next layer of metal to be deposited and the next bead is laid down in similar manner to the first. In this way, the joint is built up from bottom to top to complete the weld. As the arc oscillates from side to side, the heat of the arc is distributed so that the bead heats and also wets each plate in turn and the bead fuses to each plate as well as to the layer of metal below. Successive beads may be laid down in alternate directions along the seam or successive beads may be laid down always in the same direction.

The invention is applicable to various types of welding processes, including for example, gas shielded welding and submerged arc-welding.

Figure 2:
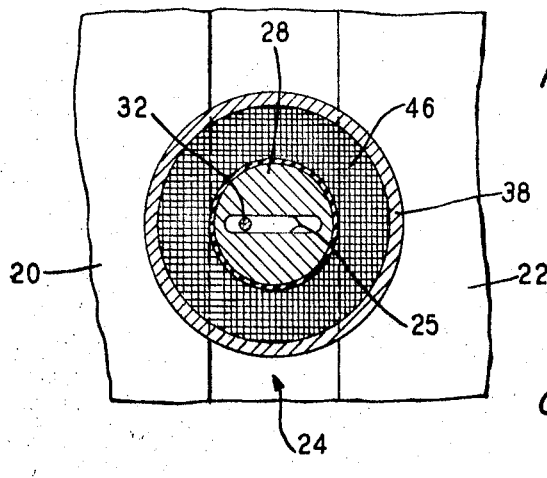
FIG. 2 is a sectional view taken at the line 2—2 in FIG. 1.

FIGS. 1 and 2 show illustrative apparatus for gas shielded welding, and FIG. 3 shows illustrative apparatus for submerged arc-welding.

Surrounding the contact tube 28 as shown in FIGS. 1 and 2, there is provided a shielding gas nozzle 38 which is of sufficient diameter to span the gap 24. The nozzle 38 is movable up and down with respect to the welding head, independently of the motion of the contact tube, by gearing illustrated as a rack 40 cooperating with a spur gear 42. The shielding gas enters the nozzle at the top through an inlet 44, passes downward and through a plurality of screens at 46, which screens promote substantially laminar flow of the gas as it leaves the bottom of the nozzle and is forced into the gap 24. By this means, turbulence of the gas is substantially prevented so that the gas surrounds the arc in the gap 24 with little tendency to entrain air which is present in the gap on either side of the stream of gas. The bottom of the nozzle is preferably maintained close to the upper surfaces of the plates 20 and 22 to reduce the danger of drawing air into the gap from the top. The contact tube 28 may have a rectangular or oval internal cross section for accommodating the serpentine form of the wire 32, or a round cross section or other shape may be used.

For use in a submerged arc process, illustrative apparatus is shown in FIG. 3, the contact tube 28 being used in similar manner as in a gas shielded process, except that the shielding gas nozzle 38 is omitted. Ahead of the contact tube 28 and movable therewith by means such as a tie rod 47, there is provided means to deposit a layer of suitable flux, the flux laying means comprising a tube 31 for supplying flux to a flux nozzle 33, shaped to fit into the groove between the plates 20, 22, and to nearly span the groove from plate to plate. The direction of motion of the contact tube and flux nozzle is the same and is indicated by an arrow 29. In FIG. 8 there is shown in section, a layer 37 of flux in powdered form, resting upon a solidified bead 35, the bead having a generally concave upper surface forming fillets 39 and 41 at the vertical faces of the respective plates 20 and 22.

FIG. 5 shows the application of the invention to vertically disposed plates 50, 52. The plates are set up with a gap 54 between their ends so that a butt joint may be formed by filling up the gap 54, which is done in substantially the same manner as illustrated in filling the gap 24 in the arrangement shown in FIG. 1 or in FIG. 3. Again there is no restriction of the length of bead to be laid down, which in this case means that there is no restriction of the thickness of the plates 50, 52. The plates are shown as joined by a horizontal weld 55 to a lower plate 56 to illustrate that in this and similar cases there is no need for a backup strip such as the strip 30 shown in FIGS. 1 and 3. Some of the beads laid in the gap 54 are illustrated in FIG. 5 at 61—64. As in the case of the gap 24 of FIGS. 1 and 3, each bead is laid down by moving the contact tube the length of the gap 54 while the wire 32 distributes the weld metal from side to side, and this process is repeated in successive passes of the welding head until the gap 54 is filled to the top.

Referring to FIG. 6, there is shown one form of mechanism for deforming the welding wire into a serpentine, or substantially sinusoidal, form as it is fed from the supply spool to the contact tube. The supply spool is shown at 100, from which the wire 101 is guided through a flexible casing 102 and a bushing 104 to oscillatable idler V-groove guide rolls 106, relatively fixed idler V-groove guide rolls 108, a bushing 110, and knurled driven feed rolls 112. Of the feed rolls 112, one or both are driven to feed the wire from the rolls 112 through a bushing 114, the body of a torch 116, and a contact tube 118. The wire in serpentine form is shown leaving the contact tube at 120.

The bushing 104 and guide rolls 106 are mounted upon an oscillator plate 122. The plate 122 is pivotally mounted upon the vertical portion of an L-member 124 which is in turn mounted upon a drive roll stand casing 126 which supports the torch 116. The casing 126 and attached parts may be supported from the frame of the welding machine as upon a stud 125. The pivot 128 for the plate 122 is preferably located approximately in alignment with the point of contact of the rolls 108 with the wire.

The member 124 supports an adjustable speed electric motor 130 which serves to oscillate the plate 122 at a frequency determined by the speed of the motor 130. The linkage from the motor 130 to the plate 122 is illustrated as including a drive shaft 132, in threaded relationship to a worm gear 134 on one end of a driven shaft 136 which may be supported from member 124. At the other end of the shaft 136 is mounted a crank wheel 138, connected to the plate 122 by a link 140 pivoted at both ends.

In the operation of the arrangement of FIG. 6, the feed rolls 112 continuously feed the wire 101 from the spool 100 to the contact tube 118 for delivery to the arc region. As the wire passes the guide rolls 108 it is bent beyond its elastic limit first in one direction and then in the other, due to the oscillating motion of the plate 122 which causes the guide rolls 106 to oscillate. It is evident that the variable speed motor 130 and connected linkage drives the plate 122 in oscillating fashion at the desired frequency. The axes of the rolls 112 are set at right angles to the axes of the rolls 106 and 108 so that the plane of the serpentine wire is parallel to the axes of the rolls 112 to prevent the rolls 112 from straightening the serpentine wire in any degree.

In successful welding tests using apparatus like that shown in FIG. 6, I have oscillated the plate 122 through angles ranging from 40° to 60° and at frequencies ranging from 25 to 100 oscillations per minute. The wire is formed into substantially a sinusoidal form having a spread of from one-half inch to 1 inch from maximum to minimum of the sinusoidal waveform. The wavelength of the sinusoidal waveform varies with the feed speed of the wire. With steel wire, I have used a feed speed of about 300 inches per minute, which at 25 oscillations per minute gives a wavelength of 12 inches, and at 100 oscillations per minute gives a wavelength of 3 inches. With aluminum wire, I have used a feed speed of about 150 inches per minute, which at 25 oscillations per minute gives a wavelength of 6 inches, and at 100 oscillations per minute gives a wavelength of 178 inches. Other wire feed speeds, angles of oscillation, and oscillation frequencies may be used depending upon the material of the wire, the width of the groove to be filled, and other factors. A spacing of about 3 inches was provided between the moving guide rolls 106 and the fixed guide rolls 108.

FIG. 7 shows another form of mechanism for imparting a serpentine form to the electrode wire. The guide rolls 106 are mounted for linear reciprocating motion instead of for angular reciprocating motion. Provision may be made for rotating the reciprocating device about a vertical axis in order that the serpentine wire may be delivered to the feed rolls 112 with the plane of the serpentine wire in any desired angular relation to the axes of the feed rolls. However, the preferred orientation of the wire is to have its plane parallel to the axis of the drive rolls 112.

The guide rolls 106 are mounted upon a slider 150 arranged to slide upon a guide rod 152 mounted upon a channel member 154. Mounted also upon the member 154 there may be provided means such as a double-acting pneumatic drive cylinder 156 arranged to operate through a drive rod 160 to impart the desired reciprocating motion to the slider 150 to bend the wire from side to side against the stationary guide rolls 108 and thus give the wire 101 the desired form.

The guide rolls 108 and bushing 110 as well as member 154 are mounted on an angle plate 164 which in turn is attached to the drive roll stand 126. The wire 101 passes through bushing 110 and then between the drive rolls 112 prior to entering the torch 116.

The apparatus shown in FIG. 7 is particularly adapted to shape the electrode in such manner as to direct the electric arc first to one side and then to the other with a significant amount of dwell of the arc on each side of the groove, thereby serving to form a curved fillet as illustrated at 39 and 41 in FIGS. 3 and 8, together with a generally concave upper surface of the bead which I have found advantageous in a submerged arc process. With the slider 150 at one end of its stroke, the wire 120 tends to retain the bend given to it by the rolls 108 and if left free upon emerging from the rolls 108 the wire would curl up in substantially circular turns in one direction, say clockwise. With the slider at the other end of its stroke, the bend in the wire is in the reverse direction tending to curl the wire into counterclockwise turns. The alternating strokes of the slider 150 produce a wire having alternate curved portions which are substantially arcs of circles, alternately clockwise and counterclockwise. At the welding arc, the wire emerges from the contact tube pointing toward one side of the groove. The direction of pointing remains substantially constant throughout the emergence of a clockwise wire segment, directing the arc to one side. During the emergence of the following wire segment the wire points toward the other side of the groove, directing the arc accordingly. In this manner it is evident that the fillets and concave surface are readily obtained.

FIG. 8 shows in full line at 43 a clockwise segment of the wire 120 immersed in the flux layer 37 and directing the welding arc to the left-hand side of the groove; and in dotted line at 45 a counterclockwise segment of the wire 120 directing the arc to the right-hand side of the groove. In practice, the wire 120 points to the left during nearly one-half a full period of alternation, then quickly swings over to the right where it remains during the next interval of nearly one-half period. The time required for a single swing-over is on the order of less than 15 percent of the the total period and preferably 6 percent.

The heat of the arc turns the flux to slag, which solidifies after the electrode passes along the length of the groove. The slag in solidifying tends to break up into short pieces and is easily dislodged from the concave surface of the underlying bead.

The invention may be used with any of the available methods of welding using a consumable electrode. The mode of metal transfer from the wire to the work may be a spray transfer mode, a drop transfer mode, or a dip transfer mode. The electrode wire may be bare, coated or cored, and the polarity of the welding power supply may be either straight or reverse. Also, an alternating current arc may be used with coated wire. The usual available types of power supplies, either constant potential, drooping or rising characteristic may be used.

It will be evident that other means and methods than those shown herein may be used for forming the electrode wire into a curved form. Also, it is not essential to the welding process that the wire be shaped during the welding operation or as the wire is being fed to the arc. It will be evident that wire may be shaped and stored, as upon a reel, and supplied to welding head through the contact tube when needed.

While illustrative forms of apparatus and methods in accordance with the invention have been described and shown herein, it will be understood that numerous changes may be made without departing from the general principles and scope of the invention.

I claim:

1. The method of joining workpieces with an electric arc-welding process by laying down a weld bead in a gap between the workpieces comprising the steps of alternately deforming a wire electrode in opposite directions so as to cause said electrode to take a set serpentine shape, simultaneously feeding said deformed wire electrode into the gap between the workpieces through a contact tube extending into and directed substantially at the center of said gap and which contact tube has an elongated passageway therethrough of generally oval cross section positioned in a plane substantially perpendicular to the direction of the seam to be welded and simultaneously moving said contact tube through the gap from end to end such that the set placed in said electrode causes it to exit said contact tube directed toward one workpiece at an angle from the vertical during substantially a half-period of oscillation and toward the other workpiece at a similar angle during substantially the entire other half of the period with the remaining portion of the period having the wire directed at points intermediate of the two workpieces.

2. The method of joining workpieces with an electric arc-welding process by laying down a weld bead in a gap between the workpieces comprising the steps of alternately deforming a wire electrode in opposite directions so as to cause said electrode to take a set serpentine shape, simultaneously feeding said deformed wire electrode into the gap between the workpieces through a contact tube extending into and directed substantially at the center of said gap and which contact tube has an elongated passageway therethrough of generally oval cross section positioned in a plane substantially perpendicular to the direction of the seam to be welded and simultaneously moving said contact tube through the gap from end to end such that the set placed in said electrode causes it to exit said contact tube directed toward one workpiece at an angle from the vertical during substantially a half-period of oscillation and toward the other workpiece at a similar angle during substantially the entire other half of the period with the remaining portion of the period which shall be approximately 6 percent thereof having the wire directed at points intermediate of the two workpieces.

UNITED STATES PATENT OFFICE
CERTIFICATE OF CORRECTION

Patent No. 3,576,966                    Dated  May 4, 1971

Inventor(s)  Cornelius J. Sullivan

It is certified that error appears in the above-identified patent and that said Letters Patent are hereby corrected as shown below:

Column 1, line 21, delete "or the welding"

Column 4, line 57, delete "178" and in lieu thereof insert --one and one-half--

Signed and sealed this 3rd day of August 1971.

(SEAL)
Attest:

EDWARD M. FLETCHER, JR.                WILLIAM E. SCHUYLER, J
Attesting Officer                       Commissioner of Patent